United States Patent

Priest

[15] 3,701,218

[45] Oct. 31, 1972

[54] SPRAY TYPE ROW CROP THINNER

[72] Inventor: Melvin E. Priest, Caldwell, Idaho

[73] Assignee: Deere & Company, Moline, Ill.

[22] Filed: Aug. 7, 1969

[21] Appl. No.: 848,161

[52] U.S. Cl. .................................. 47/1.43, 172/6
[51] Int. Cl. ....................................... A01b 41/00
[58] Field of Search .................. 172/6; 47/1.43, 1.44

[56] References Cited

UNITED STATES PATENTS

| 3,628,613 | 12/1971 | Kaufman | 172/311 |
| 3,470,965 | 10/1969 | Quickstad | 172/456 X |
| 2,400,562 | 5/1946 | Marihart | 172/6 |
| 2,682,132 | 6/1954 | Marihart | 47/1.43 |
| 2,700,923 | 1/1955 | Marihart | 172/6 |
| 2,864,292 | 12/1958 | Elliott et al. | 172/6 |
| 3,330,070 | 7/1967 | Ferm et al. | 47/1.43 |
| 3,452,822 | 7/1969 | Gugenhan et al | 172/6 |
| 3,458,952 | 8/1969 | Tschudy | 47/1.43 |

Primary Examiner—Robert E. Bagwill
Attorney—H. V. Harsha et al.

[57] ABSTRACT

An agricultural machine which is moved along the ground over a row of plants and which has a plant detecting means for sensing the presence of the plants and which controls a herbicide sprayer so as to selectively destroy plants in the row. The distance of plants left and the distance of plants destroyed may be adjusted.

9 Claims, 4 Drawing Figures

INVENTOR.
MELVIN E. PRIEST

ATTORNEYS

PATENTED OCT 31 1972 3,701,218

INVENTOR.
MELVIN E. PRIEST

BY
ATTORNEYS

3,701,218

SPRAY TYPE ROW CROP THINNER

BACKGROUND OF THE INVENTION

1. Field of the Invention

This invention relates to agricultural machinery and in particular to a machine for selectively removing plants.

2. Description of the Prior Art

Prior agricultural machines for removing plants have incorporated plant sensors which control mechanical cutters or hoes that remove plants. The adjustment of such machines is limited due to the fixed width of the hoes. Also, mechanical hoes disturb the earth and break the lateral feeder roots of the plants which are to be left in the field and this can result in a 10 percent to 15 percent loss in production.

SUMMARY OF THE INVENTION

The present invention comprises an agricultural machine formed with a frame member mounted on ground wheels and having a plant detector which controls the application of herbicide that is sprayed on the plants to selectively remove them.

A control means is connected to the plant detector and the sprayer and is adjustable to control the length of plants left in each group and the length of plants destroyed between each group of plants.

Other objects, features and advantages of the present invention will be readily apparent from the following detailed description of certain preferred embodiments thereof taken in conjunction with the accompanying drawings.

DESCRIPTION OF THE PREFERRED EMBODIMENTS

The agricultural machine of this invention is moved along a row of plants and has a plant detecting means which senses plants. The machine has a herbicide reservoir and spray which is controlled by a control means that is also connected to the plant detecting means to destroy plants in the row.

The plant detecting means might comprise an electric eye which becomes unbalanced when it detects a plant and causes the herbicide sprayer to stop, disables the eye and energizes a clutch. The clutch moves a switch actuator from a first switch which controls the above functions and the actuator moves to engage a second switch to turn on the herbicide spray. The distance between the first and second switches is adjustable and therefore the distance which is not sprayed is adjustable.

The switch actuator continues to rotate beyond the second switch until it engages a third switch which is adjustable relative to the second switch. The third switch is in the holding circuit for the clutch and also re-energizes the plant detecting means. Thus, when the switch actuator engages the third switch the eye is re-engaged and the clutch drops out and a spring returns the switch actuator to engage the first switch and the cycle is repeated.

The machine sprays herbicide for a pre-set distance which is adjustable. The color sensitive electric eye is on during the spraying process and the machine continues to spray until the eye detects a plant. This assures that if a gap exists in the plants in the row, the sprayer will not destroy plants for greater than the pre-set distance.

The spray is turned off by the eye for a pre-set distance as, for example, 1 ½ to 2 inches, and is then turned back on.

Figures 1, 2:
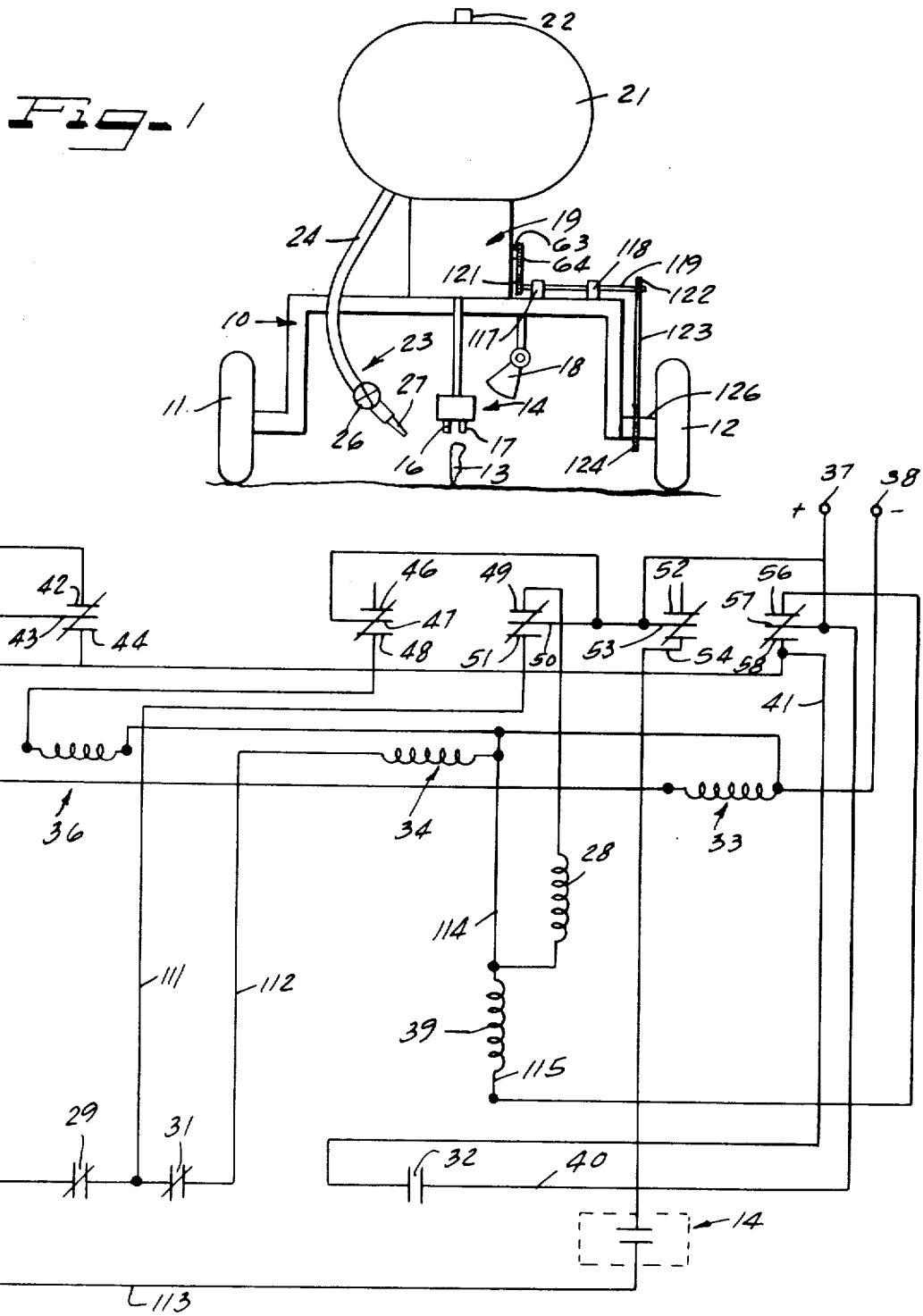
FIG. 1 is a view of the agricultural machine of this invention.
FIG. 2 is a schematic view of the control circuit of the invention.

FIG. 1 illustrates the agricultural machine of this invention and comprises a frame member 10 which is supported on ground wheels 11 and 12 that fit on either side of a row of plants 13. A tractor, not shown, pulls the machine down the row. A plant detecting means 14 may comprise a pair of electric eyes 16 and 17 which receive energy reflected from the plant 13 to detect it. An illuminating means 18 which might be an incandescent bulb is mounted by a suitable support on the frame 10 to illuminate the plants 13 so that energy is reflected to the detector 14.

The detector 14 is connected by a support from the frame and by suitable electrical leads to a control unit designated generally as 19 which is mounted on the frame of the machine.

A reservoir 21 for herbicide is mounted on the frame and has a filler cap 22. A herbicide dispenser 23 comprises a conduit 24 connected to the reservoir 21 and has a valve 26 and an outlet nozzle 27 positioned to direct herbicide on plants 13.

The electrical control system is mounted in the control unit 19 and is shown schematically in FIG. 2. The valve 26 is controlled by a valve solenoid 28. Three control switches are mounted in the control unit 19 and are designated as re-set switch 29, plant switch 31 and limit switch 32. Three relays 33, 34 and 36 are mounted in the control unit, and relay 33 has switch contacts 56, 57 and 58 and 52, 53 and 54. Relay 34 has switch contacts 46, 47 and 48 and 49, 50 and 51. Relay 36 has switch contacts 42, 43 and 44.

A pair of power input terminals 37 and 38 are connected to a suitable power supply as, for example, the power supply of the tractor which might be 24 volts DC. Terminal 38 is connected to one side of each of the energizing coils of relays 33, 34 and 36 and to one side of valve solenoid 28 and to a clutch coil 39 which forms a part of the control system.

The contact 37 is connected to relay contacts 47, 50, 53 and 57.

Contact 37 is also connected to one side of limit switch 32. The other side of the limit switch 32 is connected to contact 58 of relay 33.

The second side of the valve solenoid coil 28 is connected to contact 49 of relay 34. The second side of clutch energizing coil 39 is connected to contact 56 of relay 33. The second side of relay coil 33 is connected to contact 43 of relay 36. The second side of relay coil 34 is connected to one side of plant switch 31. The second side of the relay coil 36 is connected to contact 48 of relay 34. The re-set switch 29 is connected by lead 113 to the plant sensor 14. The other side of the sensor 14 is connected to contact 54. The other side of switch 29 is connected to switch 31 and by lead 111 to contact 51.

Figure 3:
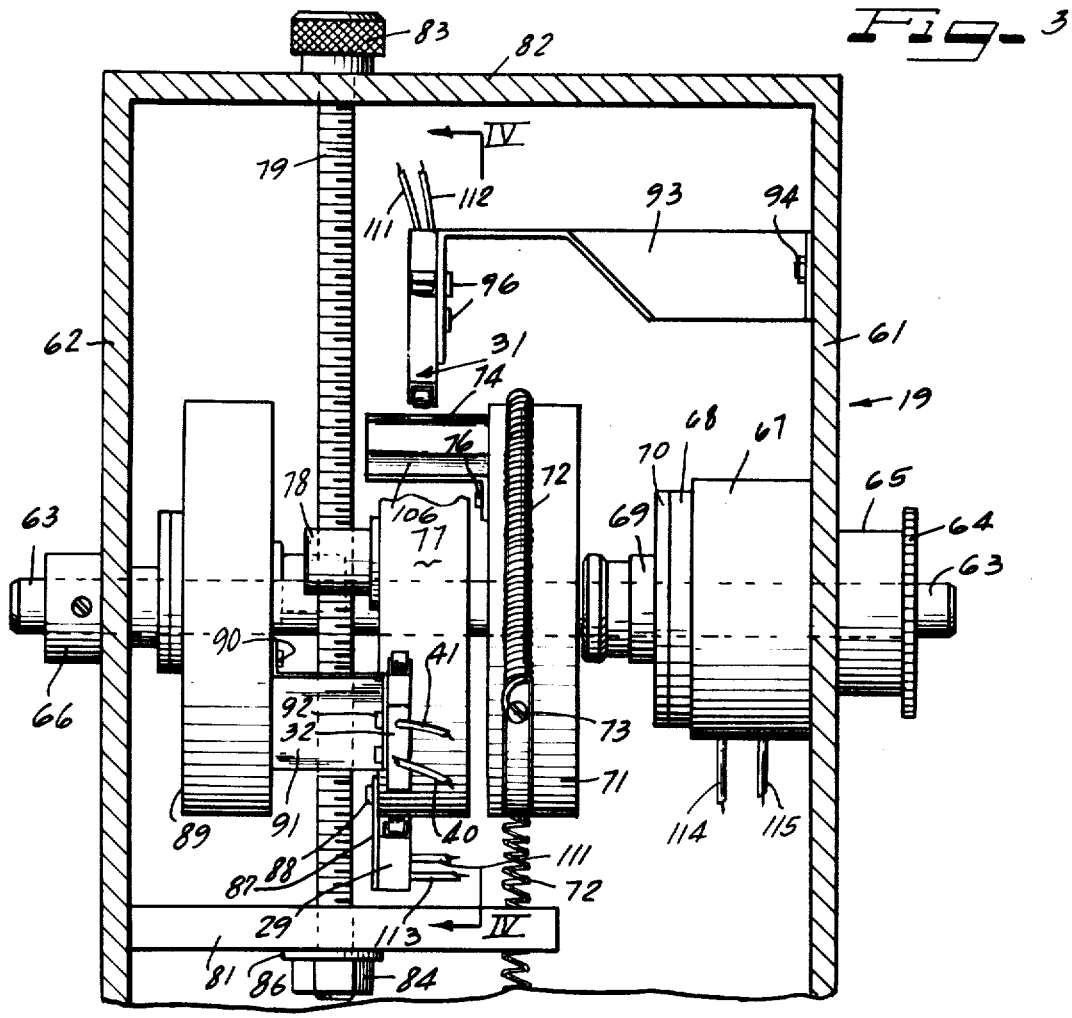
FIG. 3 is a top plan view of the control means of the invention.
Figure 4:
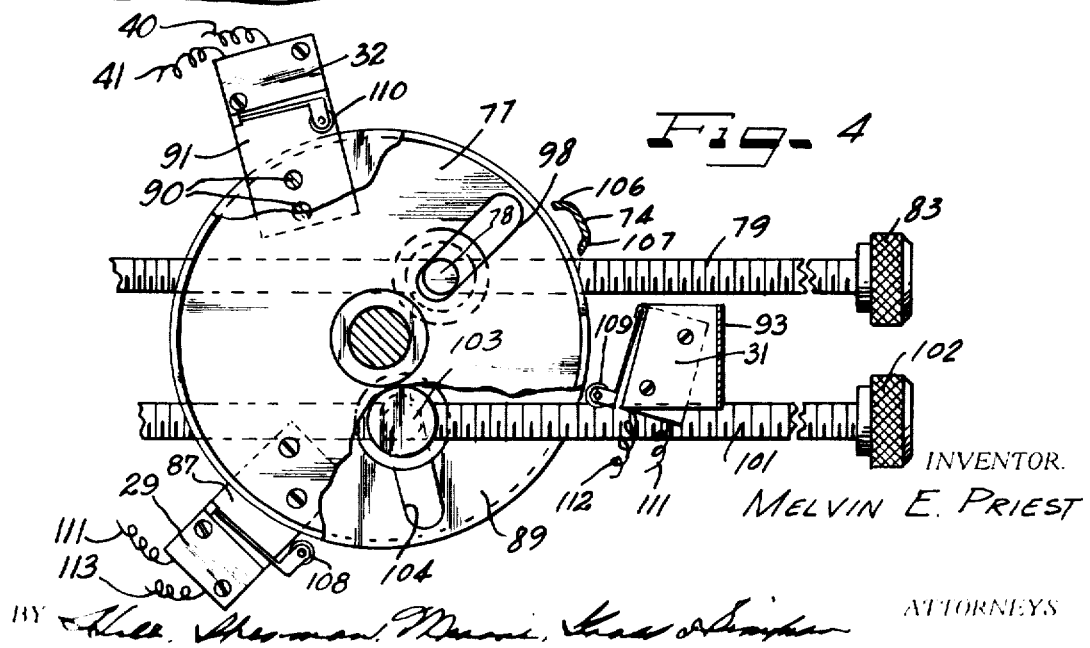
FIG. 4 is a sectional view taken on line IV—IV of FIG. 3 illustrating the switch adjusting means.

FIGS. 3 and 4 illustrate the control apparatus of the invention which is contained in the unit 19. A generally rectangular container is formed with side walls 61 and 62 and has an end wall 82 as best shown in FIG. 3. A shaft 63 extends transversely through the container and is rotatably supported in side walls 61 and 62. Collars 65 and 66 are attached to the shaft 63 on the outside of walls 61 and 62, respectively, to prevent it from moving transversely of the walls 61 and 62. A spocket 64 is non-rotatably attached to shaft 63 to drive it. A magnetic clutch 67 is mounted to the inside of wall 61 about shaft 63 and has a driving portion 68 which rotates with shaft 63. A driven portion of the clutch 69 has a disc 70 which may be magnetically coupled to the driving portion 68 when the magnetic clutch is energized. The driven portion 69 is connected to a disc 71 that is rotatably mounted on the shaft 63. The disc 71 is spring biased by a spring 72 which is attached to the container wall at one end and has its other end connected by a set screw 73 to the edge of the disc 71. Spring 72 biases the disc 71 in a first direction at all times. A switch actuator 74 is attached to the edge of disc 71 by set screws 76.

A re-set switch-carrying disc 77 is rotatably mounted on the shaft 63. A transversely extending lug 78 is mounted in a slot 98 in disc 77 and is threaded to receive a holding and adjusting lead screw 79. The lead screw 79 is rotatably supported in a bracket 81 connected to the wall 62 and by the wall 82. A knurled knob 83 is mounted on the shaft 79 for adjusting the angular position of the disc 77. A nut 84 and a washer 86 are mounted on the shaft 79 adjacent the bracket 81.

The re-set switch 29 is mounted to the disc 77 by a bracket 87 which is connected to the edge of the disc 77 by set screws 88.

A limit switch disc 89 is rotatably supported on the shaft 63 and carries a switch supporting bracket 91 that is attached to its edge by set screws 90. Disc 89 supports the limit switch 32 by set screws 92.

The limit switch disc 89 may be rotatably adjusted to vary the position of the limit switch 32 by a threaded shaft 101 which carries a knurled knob 102, as best shown in FIG. 4. The shaft 101 is rotatably supported between the bracket 81 and the wall 82 in a fashion similar to shaft 79. The shaft 101 is threadedly received through an adjusting lug 103 which is slidably mounted in a slot 104 of the disc 89, as shown in cutaway in FIG. 4. Thus, by rotating the shaft 101 by knob 102, the lug 103 may be made to move to the left or right relative to FIG. 4 which in turn causes the disc 89 to rotate either counterclockwise or clockwise relative to FIG. 4 to adjust the position of the limit switch 32.

The switch actuator 74 is formed with cam portions 106 and 107 on either side and at a home position is engageable with a switch actuator 108 that actuates re-set switch 29. Actuator 74 also engages a switch actuator 109 which actuates plant switch 31. Plant switch 31 is mounted by bracket 93 to the wall 61. Holding means 94 attach the bracket 93 to the wall 61 and holding means 96 attach the plant switch 31 to the bracket 93.

Actuator 74 also engages an actuator 110 which actuates limit switch 32.

Leads 40 and 41 are connected to limit switch 32, as shown in FIGS. 2, 3 and 4. Leads 111 and 112 are connected to plant switch 31 and leads 111 and 113 are connected to reset switch 29. Leads 114 and 115 are connected to the magnetic clutch 67.

As shown in FIG. 1, the shaft 63 is driven by the ground wheels through a belt and gearing arrangement comprising a rotatable shaft 119 which is mounted in suitable brackets 117 and 118 mounted on the frame 10. Shaft 119 carries a gear 121 that engages gear 64 to rotate it. A gear 122 is also mounted on shaft 119 and is coupled by a chain or belt 123 to a gear 124 which is mounted on an axle driven by the ground wheels 12. Thus, as the ground wheels rotate, gear 124 is driven and the shaft 63 is driven through the belt and gear arrangement.

The distance between the re-set switch 29 and the plant switch 31 determines the number of plants to be left and the space in the row which will not be sprayed. This can be adjusted by rotating knob 83 on shaft 79.

The distance between switches 31 and 32 determines the distance to be sprayed and this can be adjusted by rotating knob 102 on shaft 101.

In operation, when the electric eye 14 detects a plant, the spray from nozzle 27 is turned off by energizing coil 28 of valve 26 and the spray is stopped. Simultaneously the eye 14 is disabled and the clutch 67 is energized through the leads 114 and 115 to coil 39. The clutch 67 causes the disc 71 to rotate carrying the switch actuator 74 with it against the bias of the spring 72. This allows reset switch 29 to open and the switch actuator continues to rotate and pass plant switch 31 to actuate it. When plant switch 31 is actuated the valve 26 is turned on by valve coil 28.

The disc 71 continues to rotate until the switch actuator 74 engages the limit switch 32. When the switch actuator 74 engages the switch actuator 110 of limit switch 32 the electric eye 14 is re-energized and the clutch 67 is de-energized and the spring 72 returns the disc 71 to the rest position where it again closes reset switch 29 through the actuator 108 and the cycle is repeated.

The switches 29 and 32 are both in the holding circuit for the clutch.

When the machine is started it goes through a 10-inch latching cycle to cut-in relay 33.

The principles of the invention explained in connection with the specific exemplifications thereon will suggest many other applications and modifications of the same. It is accordingly desired that in construing the breadth of the appended claims they shall not be limited to the specific details shown and described in connection with the exemplifications thereof.

I claim as my invention:

1. Control means for an agricultural plant thinning machine having a frame adapted to move along a row of plants, a plant detector mounted on said frame and adapted to detect plants in said row, and a herbicide dispenser including valve means controlled by said control means to dispense herbicide on selected said plants, said control means comprising:

a shaft rotatably mounted on said frame;
means for rotatably driving said shaft;

an energizable clutch having an element mounted on said shaft to rotate therewith;

a driven member rotatably mounted on said frame and being rotatably driven by said clutch when said clutch is energized;

a switch actuator connected to said driven member for movement along a path from a starting position in response to rotation of said driven member;

reset, plant and limit switches mounted in spaced relation on said frame in the path of said switch actuator and being actuatable in succession by said switch actuator as it moves along said path;

means connecting said reset switch with said valve means on said herbicide dispenser, said plant detector and said clutch for energizing said clutch and closing said valve means in response to detection of a plant by said plant detector and actuation of said reset switch by said switch actuator;

means connecting said plant switch and said valve means on said herbicide dispenser for opening said valve means in response to actuation of said plant switch by said switch actuator;

means connecting said limit switch and said clutch for deenergizing said clutch in response to actuation of said limit switch by said switch actuator; and spring return means connected to said driven member for returning said switch actuator along said path from said limit switch to its starting position.

2. The invention defined in claim 1 wherein said switch actuator is mounted on said driven member for movement therewith along an arcuate path, and said reset, plant and limit switches are located on said arcuate path.

3. The invention defined in claim 2 including means mounting said reset and plant switches on said frame for adjustment of the distance between said reset and plant switches.

4. The invention defined in claim 3 including a reset switch support mounted on said frame for rotation about the axis of rotation of said driven member, means mounting said reset switch on said reset switch support for movement therewith along the arcuate path of said switch actuator, and means connecting said reset switch support and said frame for locking said reset switch support in different positions relative to said frame.

5. The invention defined in claim 4 wherein said reset switch support has a slot formed therein and wherein said means connecting said reset switch support and said frame comprises a first lead screw rotatably supported on said frame, and a threaded projecting member mounted in the slot in said reset switch support and threadably receiving said first lead screw.

6. The invention defined in claim 2 including means mounting said plant and limit switches on said frame for adjustment of the distance between said plant and limit switches.

7. The invention defined in claim 6 including a limit switch support mounted on said frame for rotation about the axis of rotation of said driven member, means mounting said limit switch on said limit switch support for movement therewith along the arcuate path of said switch actuator, and means connecting said limit switch support and said frame for locking said limit switch support in different positions relative to said frame.

8. The invention defined in claim 7 wherein said limit switch support has a slot formed therein and wherein said means connecting said limit switch support and said frame comprises a second lead screw rotatably supported on said frame, and a threaded projecting member mounted in the slot in said limit switch support and threadably receiving said second lead screw.

9. Control means for an agricultural plant thinning machine having a frame adapted to move along a row of plants, a plant detector mounted on said frame and selectively operate to detect plants in said row, and a herbicide dispenser including valve means controlled by said control means to dispense herbicide on selected said plants, said control means comprising:

a shaft rotatably mounted on said frame;

means for rotatably driving said shaft;

an energizable clutch having an element mounted on said shaft to rotate therewith;

a driven member rotatably mounted on said frame and being rotatably driven by said clutch when said clutch is energized;

a switch actuator connected to said driven member for movement along a path from a starting position in response to rotation of said driven member;

reset, plant and limit switches mounted in spaced relation on said frame in the path of said switch actuator and being actuatable in succession by said switch actuator as it moves along said path, said switch actuator actuating said reset switch when in its starting position;

means connecting said reset switch with said valve means on said herbicide dispenser, said plant detector and said clutch for energizing said clutch, closing said valve means and deactivating said plant detector in response to detection of a plant by said plant detector and actuation of said reset switch by said switch actuator;

means connecting said plant switch and said valve means on said herbicide dispenser for opening said valve means in response to actuation of said plant switch by said switch actuator;

means connecting said limit switch and said clutch for deenergizing said clutch in response to actuation of said limit switch by said switch actuator;

spring return means connected to said driven member for returning said switch actuator along said path from said limit switch to its starting position; and means connecting said reset switch with said plant detector for reactivating said plant detector in response to return of said switch actuator to its starting position.

* * * * *